(12) United States Patent
Hibbert et al.

(10) Patent No.: US 7,374,188 B2
(45) Date of Patent: May 20, 2008

(54) VEHICLE TRACKING CONTROL SYSTEM

(75) Inventors: Kirk D. Hibbert, Goodridge, MN (US); Russell Ebert, Lake Shore, MN (US)

(73) Assignee: Artic Cat Inc., Thief River Falls, MN (US)

( * ) Notice: Subject to any disclaimer, the term of this patent is extended or adjusted under 35 U.S.C. 154(b) by 263 days.

(21) Appl. No.: 11/061,317

(22) Filed: Feb. 18, 2005

(65) Prior Publication Data

US 2006/0185920 A1 Aug. 24, 2006

(51) Int. Cl.
*B60G 3/12* (2006.01)
(52) U.S. Cl. ............... 280/124.128; 180/190
(58) Field of Classification Search ............ 280/16, 280/17, 21.1, 22, 22.1, 124.128, 124.148, 280/124.145; 180/183–185, 190
See application file for complete search history.

(56) References Cited

U.S. PATENT DOCUMENTS

| 1,444,114 | A | * | 2/1923 | Enstad ............... 280/21.1 |
| 4,328,851 | A | | 5/1982 | Randle |
| 5,029,664 | A | | 7/1991 | Zulawski |
| 5,181,741 | A | * | 1/1993 | Sheiman et al. ............ 280/845 |
| 6,860,352 | B2 | * | 3/2005 | Mallette et al. ............ 180/182 |
| 6,955,237 | B1 | * | 10/2005 | Przekwas et al. ........... 180/182 |
| 6,976,550 | B2 | * | 12/2005 | Vaisanen .................... 180/190 |
| 2005/0126839 | A1 | * | 6/2005 | Rasidescu et al. .......... 180/190 |

* cited by examiner

*Primary Examiner*—Lesley D. Morris
*Assistant Examiner*—Maurice Williams
(74) *Attorney, Agent, or Firm*—Black Lowe & Graham, PLLC

(57) ABSTRACT

The specification herein discloses a tracking control system for a vehicle such as a snowmobile. Such a vehicle includes a chassis with at least one ride member, such as a ski. The tracking control system includes a suspension arm, a spindle, and a slide bar. The suspension arm extends outwardly from the chassis, the arm being pivotally secured to the chassis. The spindle is secured to an outward end of the suspension arm. The spindle has an upper end a lower end with the slide bar secured to the lower end. The slide bar is oriented generally transverse to the spindle and to a major axis of the ski. The ski is movably coupled to the slide bar and spring biased in a direction away from the chassis.

21 Claims, 5 Drawing Sheets

VEHICLE TRACKING CONTROL SYSTEM

FIELD OF THE INVENTION

This invention relates generally to vehicle suspension systems and, more specifically, to a snowmobile front suspension system with ski tracking control.

BACKGROUND OF THE INVENTION

Snowmobiles have increased in power and speed. With these increases have come more aggressive skis and tracks, along with extended suspension travel. Increased vertical travel results in more lateral ski movement upon compression of the suspension. Such lateral movement makes the snowmobile feel unstable. It may feel as if it will dart to one side or the other. For example if a bump is encountered on one ski the outward movement of the ski that occurs with the upward suspension travel will tend to push the snowmobile to the opposite direction. The steering may also jerk. Furthermore, the ski and its skag tend to hunt grooves and ruts, giving a feeling of uneasiness to the rider as the skis pull the steering and snowmobile side to side.

Lateral ski movement with suspension action is due to the common suspension arms being pivotally secured to the snowmobile chassis. As the arms pivot upwardly relative to the chassis, they also swing outwardly and/or inwardly swing through an arcuate path. The arms are initially angled downwardly from the chassis, before suspension compression. As the suspension is compressed the arms initially swing up and laterally out. If the arms travel past horizontal the ends come slightly back in towards the chassis. Such lateral movement may diminish the control of the snowmobile and the overall smoothness of the ride.

Beyond these more obvious disadvantages, the suspension is somewhat less able to freely travel as it is bound by the bite of the skis into the snow. In order for the suspension to travel upwardly relative to the chassis, it must overcome the force keeping the ski tracking. It must push one or both skis to the side. This binds the suspension to some extent from absorbing vertical impacts. Generally the ski with the better bite at the time a terrain feature is encountered will track while the other ski will slide to the side. This is attenuated somewhat by the mass of the snowmobile. However, the rider may not be able to predict the lateral action in the split second required as the suspension is compressed.

The problem is amplified at high speed. Quick, unexpected lateral movements of the snowmobile that are induced by the front suspension reacting to undulations in the terrain can be dangerous. The rider may find it very tiring having to be extremely vigilant is watching for every little bump that he or she may encounter. If visibility is low, such as at night, or a passenger is aboard the driver must significantly decrease speed to travel safely. The passenger is not typically as active or able to watch for undulations in terrain. The passenger is likely to be surprised by the lateral movements.

The problem has been recognized, although it has been amplified with increased suspension travel in the past several years. U.S. Pat. No. 5,029,664, incorporated herein by reference, depicts a four-bar linkage system that tilts the lower end of the steering spindle inwardly as the suspension is compressed such that the upward path of a point on the bottom of the ski is more vertical. Such a system may improve stability in some situations, but becomes more difficult to carry out with increases in suspension travel. Change in the side-tilt angle of the ski that would result from tilting the spindle as the suspension is compressed may cause the ski to dart to one side or the other, especially with the more aggressive skis available. Many skis have skags and/or sidecuts that help turn the ski as it is tilted. Thus, excessive tilting may tend to exacerbate the problem.

One approach, depicted in U.S. Pat. No. 4,489,954, employs a strut-type suspension for controlling movement of a snowmobile ski relative to the chassis. This type of system has found extensive usage in automobiles, but some shortcomings have become apparent when it is used on snowmobiles due to rough terrain and severe conditions in which snowmobiles are often used. One problem being the cost of replacement struts when they are damaged. Use of the system in long travel suspensions is also difficult. The system also becomes more prone to damage as its size is increased for increased travel. Furthermore, friction and lateral alignment may be a problem, especially when cornering.

Thus an unmet need exists for a suspension and tracking system that overcomes the disadvantages of lateral suspension movement without suspension binding, excessive expense, or ski tilting problems.

SUMMARY OF THE INVENTION

The present tracking control system decreases the tendency of a vehicle, such as a snowmobile, to dart during suspension action. Lighter input loads are placed on the ski suspension components since the arms do not have to dislodge the tracking of the skis to move upwardly. The steering effort and abrupt feedback is reduced. These and other advantages are realized as the ski stance remains more constant with the system of the present invention.

The present invention provides an attachment coupling for a vehicle riding member. The riding member is arranged for engagement with the riding surface. The attachment coupling secures the riding member to a vehicle suspension. The coupling includes a translational member and a biasing member. The translational member is secured to an outer end of the vehicle suspension. The translational member allows the riding member to translate generally transversely to the vehicle. The translational member includes an outer end and an inner end. The biasing member is coupled to the riding member. The biasing member biases the riding member to a pre-set position on the translational member between the outer end and the inner end.

In accordance with one aspect of the invention, the translational member includes slide bar arranged generally transverse to the direction of movement of the riding member. The riding member shifts position along the slide bar during suspension movement. Preferably, the riding member is biased to the outer end of the translational member. A spring is preferably used as the biasing member. The spring is disposed on the slide bar.

In a further aspect of the invention, a steering spindle is coupled between the suspension and the riding member. The translational member is secured to the lower end of the spindle. In the preferred embodiment, the riding member includes a ski attached to the lower end of the spindle. The translational member couples the ski to the spindle.

In accordance with further aspects of the invention, a vehicle suspension is provided. The suspension is secured between the vehicle and a riding member. The suspension includes a suspension arm, a spindle, a slide member, and a biasing member. The suspension arm extends from the vehicle. The spindle is secured to the end of the suspension arm. The slide member is secured to the spindle. The slide member includes an inner end and an outer end. The riding member is slidably mounted on the slide member. The biasing member is coupled to the riding member. The biasing member biases the riding member toward the outer end of the slide member. Preferably, the slide member is a rod on which the riding member is secured. The biasing member is a spring held on the rod.

In another aspect of the invention, a second suspension arm is secured between the vehicle and the spindle. In the preferred embodiment, the ski includes a mounting saddle. The slide member is secured within the mounting saddle along an axis generally transverse to the longitudinal direction of the ski. A spring is positioned within the ski saddle between the spindle and one side of the saddle to bias the ski away from the chassis of the vehicle.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
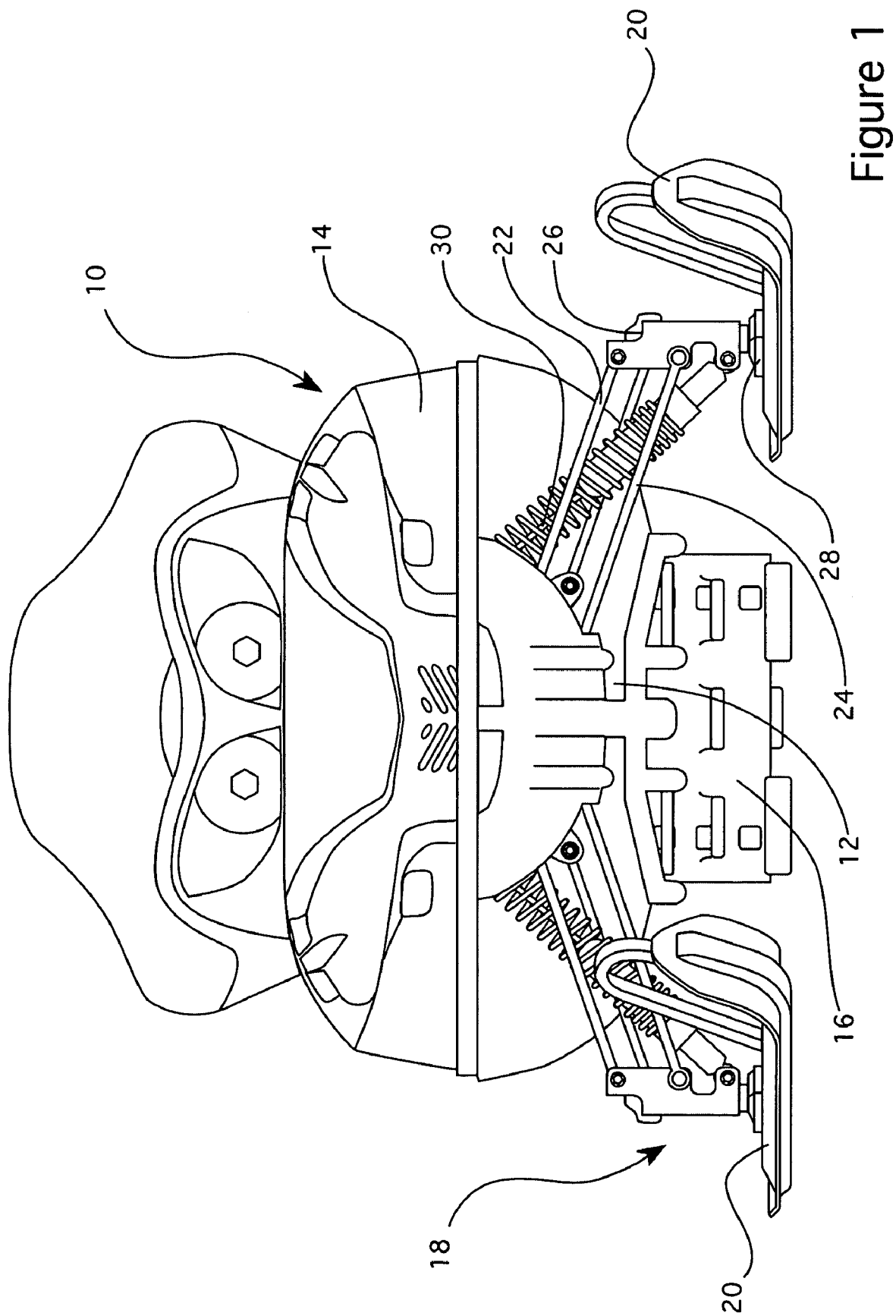
FIG. 1 is a front-elevational view of a snowmobile including the tracking control system.

Referring first to FIG. 1, a snowmobile with a tracking control system is illustrated. Snowmobile 10 includes a chassis 12, a body 14, a track 16, a front suspension 18, and skis 20. Front suspension 18 is secured forward of the engine and is mounted to chassis 12. Track 16 is typically behind the engine and provides the forward driving force for the snowmobile. Skis 20 are secured at the outer ends of front suspension 20 to provide the steering function as well as lift on the snow for the front of the snowmobile. The details of the steering mechanism are preferably as found in current snowmobiles and thus, will not be described in detail here.

Front suspension 18 includes arms, spindles, and shock absorbers on both the right and left sides of the front end of snowmobile 10. For purposes of description herein, we will describe the left side suspension and tracking system with the understanding that the right side is preferably the mirror image thereof. An upper arm 22 extends from the chassis downwardly and outwardly. A lower arm 24 extends from a lower portion of the chassis somewhat inboard of the connection of upper arm 22. Lower arm 24 also extends downwardly and outwardly. It may be parallel or substantially parallel to upper arm 22. Spindle 26 is mounted at the outer ends of upper and lower arms 22 and 24. Spindle 26 extends downwardly from its connection with arms 22 and 24 to engagement with ski 20 through attachment with a saddle 28 within ski 20. Note herein that a saddle is described as being the ski mounting location for spindle 26. An actual separate saddle member may or may not be used while the term "saddle" will be used to describe the general mounting area. A shock absorber 30 with a spring thereon extends between spindle 26 and chassis 12. Details of shock absorber 30 and its mounting will not be discussed herein. Conventional or other shocks or shock mountings may be used to provide the downward force on spindle 26 relative to chassis 12.

Figure 2:
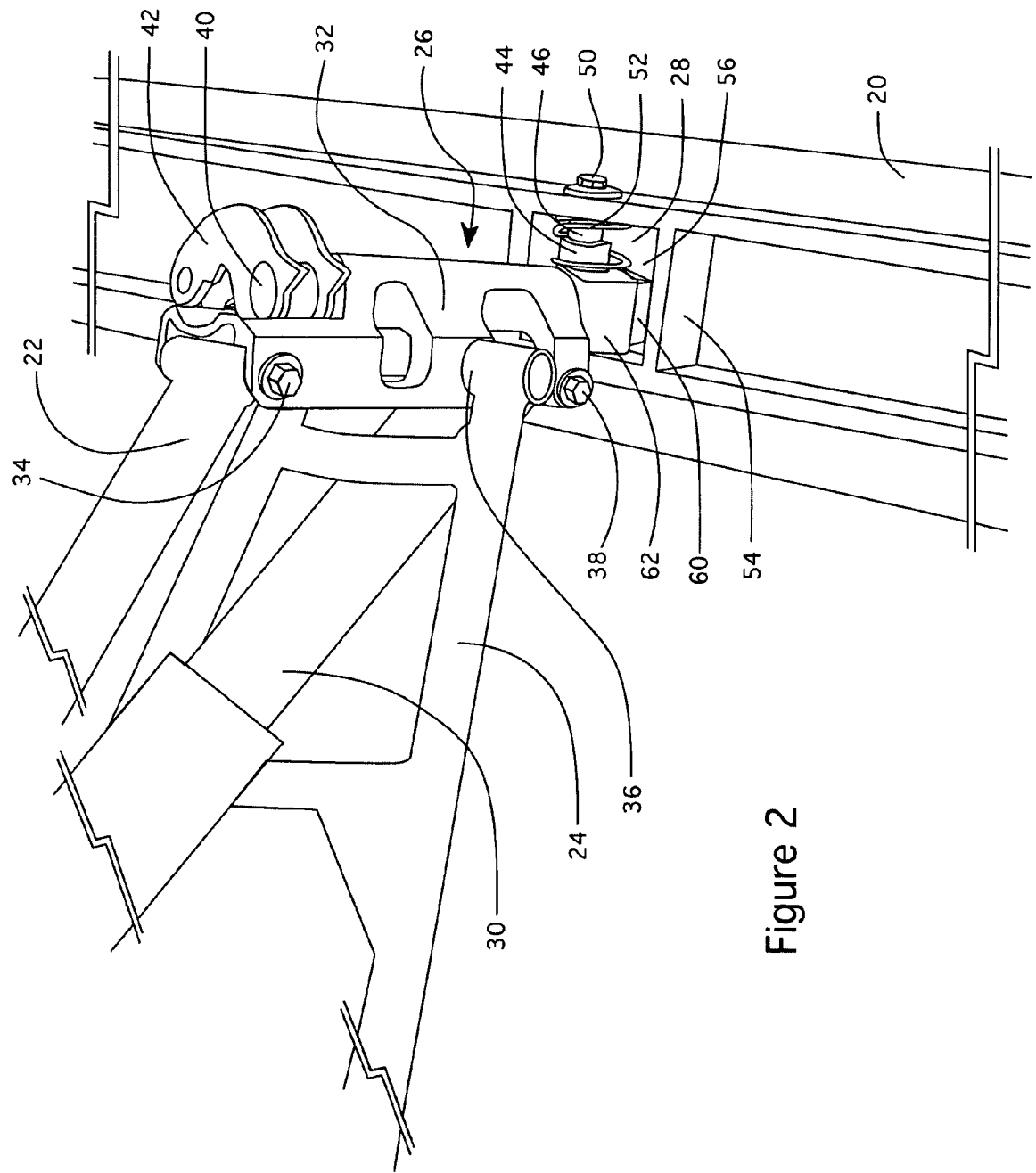
FIG. 2 is a perspective view of the ski slide mechanism.
Figure 3:
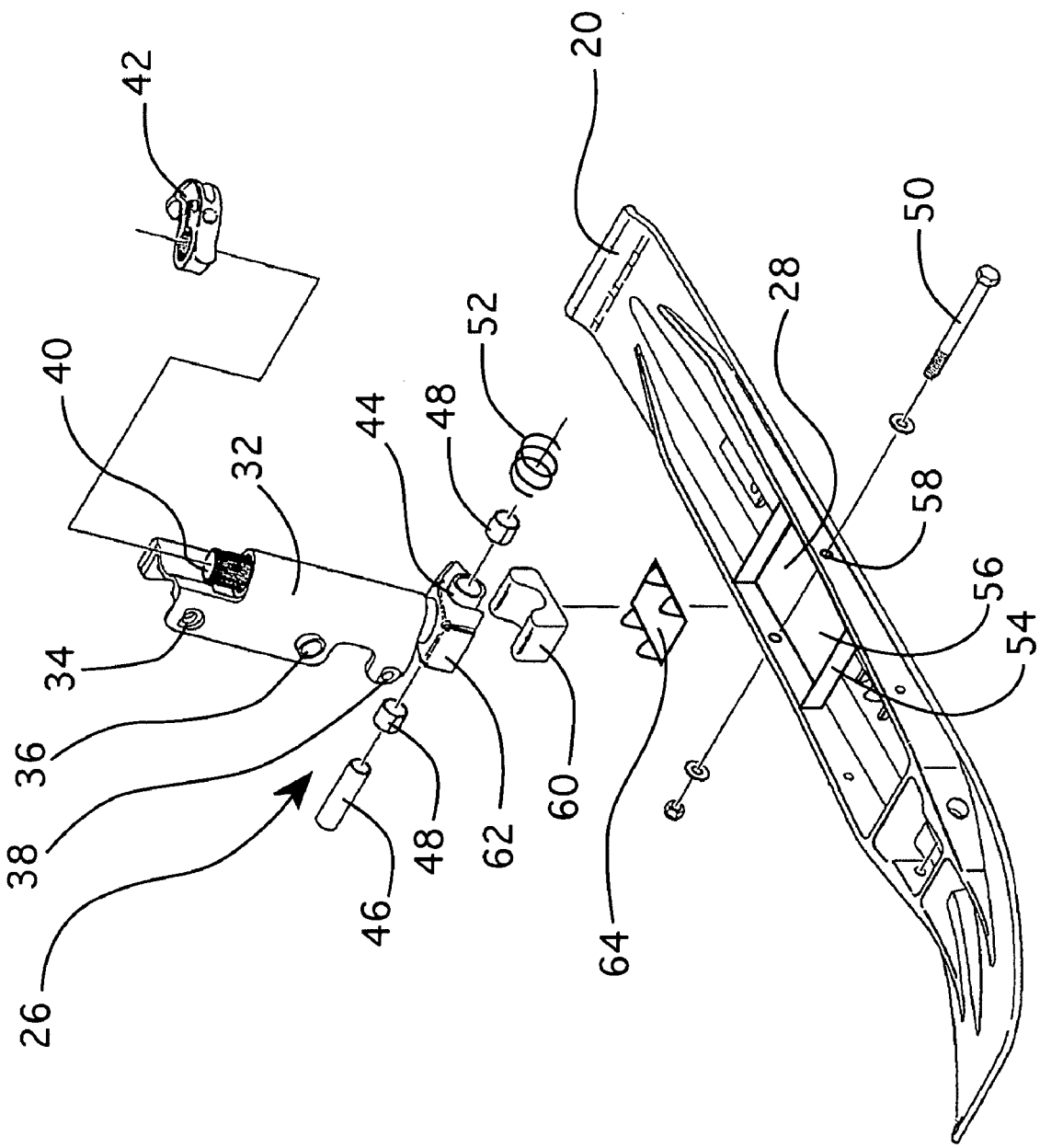
FIG. 3 is an exploded view of the mechanism.

Turning now to FIGS. 2 and 3, the details of the spindle and tracking control system will now be described. Spindle 26 includes a spindle housing 32. Spindle housing 32 is shaped and configured for mounting the outer ends of the arms as well as the shock absorber. Thus, spindle housing 32 includes an upper-arm mount 34 at the upper end thereof, and a lower-arm mount 36 at a mid portion thereof. A shock mount 38 is situated at the lower end of spindle housing 32. These various mounts comprise fastener openings for bearings and axles that may be secured to spindle 32 for securement of the arms and shock absorber. Spindle housing 32 may be machined from aluminum or formed in other methods from other materials. In the preferred embodiment shown herein, spindle housing 32 is machined from aluminum to include the various apertures and mounting structures.

Spindle housing 32 includes a downwardly extending opening somewhat transverse to mounts 34, 36, and 38 to hold a spindle shaft 40. Housing 32 is formed such that the upper end of spindle shaft 40 extends external to spindle housing 32 for mounting a steering arm 42.

Spindle shaft 40 also extends from the bottom end of spindle housing 32 such that it may be attached to ski 20. At the lower end of spindle shaft 40 is secured a spindle tube 44. Spindle tube 44 is preferably welded to the lower end of spindle shaft 40 and is preferably in the shape of a tube extending transverse to the longitudinal axis of spindle shaft 40. Spindle tube 44 includes a bore in the middle, through which an axle 46 is disposed. The bore or center axis of spindle tube 44 as well as the axis of axle 46 is transverse to the major axis of ski 20. Thus, ski 20 is able to pivot about axle 46 as it runs over various terrain features.

Bushings 48 are secured between spindle tube 44 and axle 46 to provide a bearing surface for the movement of axle 46 relative to spindle tube 44. Bushings 48 are preferably formed of metal-backed nylon material. The function of Bushings 48 may alternatively be replaced with roller bearings, pin bearings, or other bearing surface or material. An axle bolt 50 extends through ski 20, through the center of axle 46 to the other side of ski 20 to secure the assembly in place.

Ski 20 includes saddle walls 54, through which axle bolt 50 extends. Ski 20 also includes a saddle floor 56 at the bottom of saddle walls 54. Saddle walls 54 include axle mounting holes 58 for securement of axle bolt 50. Fore and aft saddle walls may also be provided in the preferred embodiment for strengthening of the mounting area of ski 20. Alternatively, a separate ski saddle may be provided that strengthens this region and is mounted into place within ski 20.

The length of axle 46 is greater than that of spindle tube 44 such that a small portion of axle 46 is exposed beyond spindle tube 44. This spacing allows spindle 26 to shift laterally relative to ski 20 as the suspension compresses or extends. In the currently preferred embodiment, spindle tube 44 is approximately two and one-half inches in length while axle 46 is three inches in length, thus providing available lateral movement between ski 20 and spindle 26 of approximately one-half inch. This is enough movement to deal with most of the lateral movement of front suspension 18 on each side of snowmobile 10. A spring 52 is secured within saddle 28 disposed on spindle tube 44 over axle 46 between an inner surface of a saddle wall 54 and a damper cup 62. This spring biases ski 20 outwardly from spindle 26 in the preferred embodiment such that the downwardly extending suspension may push laterally outward against the force of spring 52 such that ski 20 may track straight during suspension action. This will be discussed in more detail below in connection with FIGS. 4 and 5.

A damper 60 is held between spindle tube 44 and saddle floor 56 in a conventional fashion. A damper cup 62 is secured to the lower end of spindle shaft 40 and to spindle tube 44 for a compression of damper 60 to bias the pitch of ski 20 to a preferred position. A slide plate 64 is preferably secured to the underside of damper 60 such that friction is reduced between the under side of damper 60 and saddle floor 56. This reduction in friction is advantageous since ski 20 will move medially and laterally relative to the underside of damper 60 during suspension action.

Figure 4A:
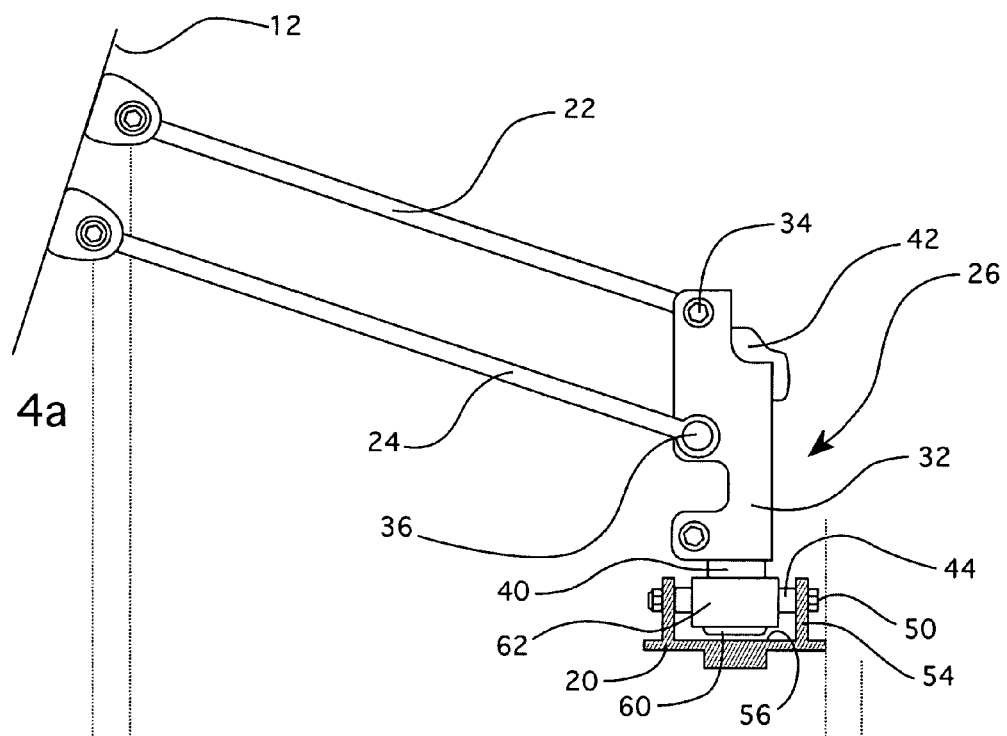
FIG. 4A is a front-elevational view of a prior-art ski suspension in the extended position.
Figure 4B:
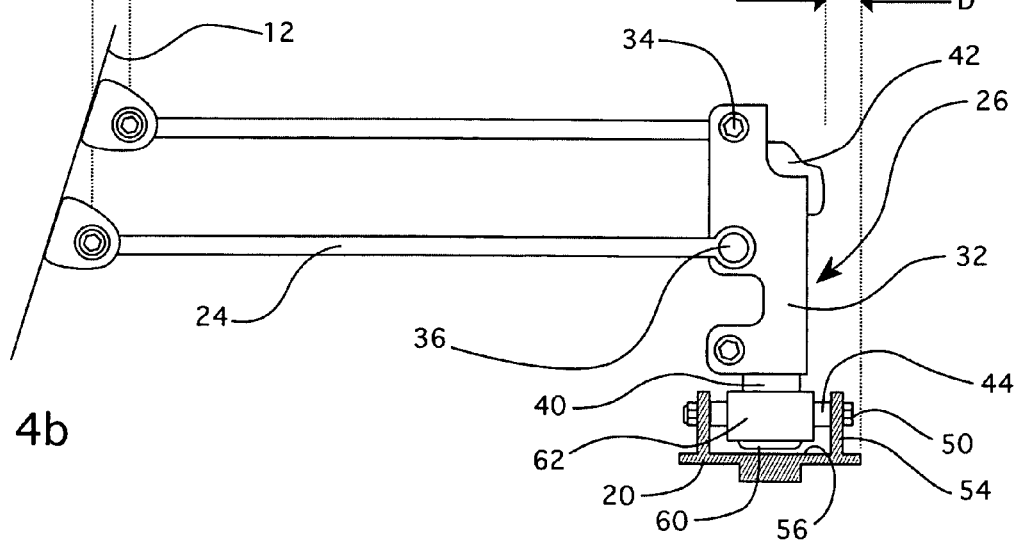
FIG. 4B is the same suspension in a compressed state.

Referring now to FIGS. 4A and 4B, we will describe the action of a conventional ski, spindle, and suspension as the ski moves up relative to the chassis. Note in this prior art embodiment, spindle tube 44 is the same length as axle 46 such that axle 46 is not shown in the diagram. Thus, spindle 26 does not shift medially or laterally relative to ski 20. FIG. 4A illustrates a position in which the suspension is uncompressed. In this situation, upper and lower arms 22 and 24 extend outwardly and downwardly from chassis 12. Ski 20 is at an initial lateral distance from chassis 12.

FIG. 4B illustrates the situation in which the suspension is compressed due to either lowering of chassis 12 or raising of ski 20 due to such encountering a bump, landing a jump, or other encounters of terrain features or forces. Note that due to the upward and slightly outward swinging of upper and lower arms 22 and 24, ski 20 has shifted laterally, a distance D. Such shifting upsets the tracking of ski 20, produces feedback to the steering system, and generally creates an uneasy feel for the rider. The distance D may result in pushing the chassis a distance D or further such that the rider and/or passenger are upset. The entire ski stance may widen if both the right and left suspension are compressed the same amount such that the stance would increase by twice D. If only one side of the ski suspension encounters a bump, then the ski may tend to dart one direction or another also further upsetting the stable ride of the snowmobile. Even while riding the snowmobile without encountering a bump that significantly compresses the suspension, the ski and the skag in the middle of the ski tend to hunt grooves and ruts, which also gives a feeling of uneasiness to the rider as there is no allowance for small shifts for the ski to track without pulling the snowmobile side to side.

For the suspension to compress to absorb impacts, the tracking must be upset to some extent. Thus, if the ski is tracking solid, it tends to have a binding effect on the suspension as the suspension cannot compress unless some shifting of one ski or the other or both occurs. Thus, free movement of the suspension is inhibited.

Figure 5A:
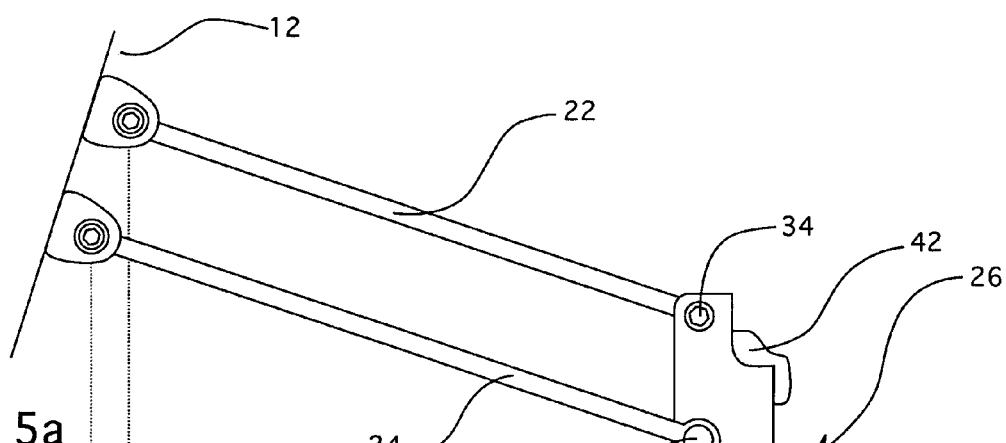
FIG. 5A is a snowmobile suspension with a tracking control system in the extended state.
Figure 5B:
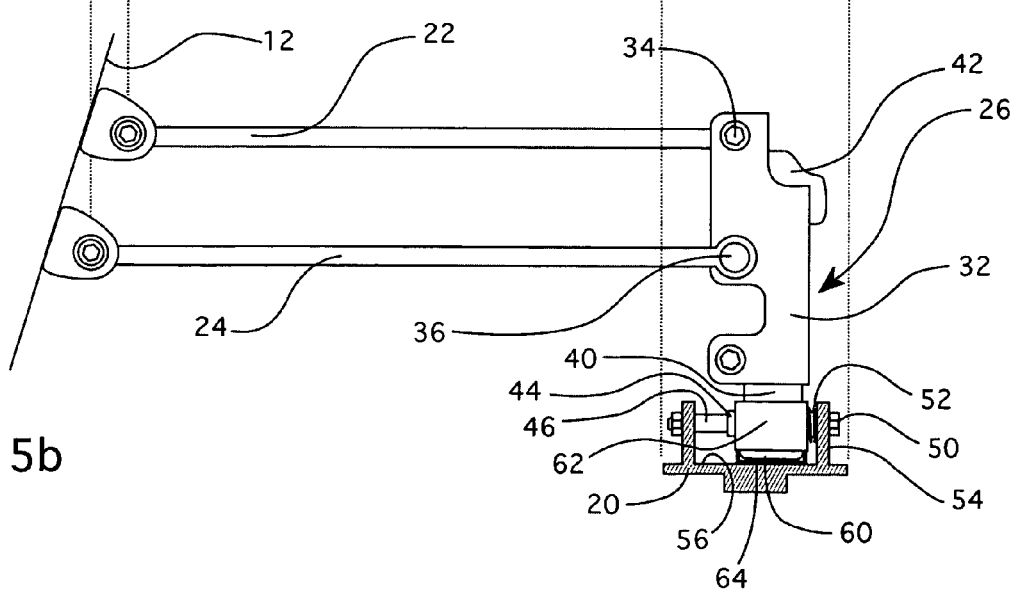
FIG. 5B is the same suspension in the compressed state.

In contrast, the tracking control system of the present invention, as illustrated in FIGS. 5A and 5B, helps eliminate these drawbacks. In the uncompressed state illustrated in FIG. 5A, spindle 26 is preferably biased to an inboard side of ski 20 by pressure from spring 52. Bushings 48 allow spindle tube 44 to slide axially along axle 46. When a bump is encountered such that upper and lower arms 22 and 24 swing upwardly and outwardly, spindle 26 is allowed to slide to a more outward side of ski 60 by compressing spring 52 against saddle 54. Ski 20 is able to maintain tracking along its previous path.

Besides overcoming the above-described disadvantages of the prior-art suspension systems, the tracking control system provides a lighter input load on the ski suspension components and reduces the initial steering effort required to control the snowmobile. The ski tends to bite more while turning as it is allowed a small lateral movement relative to spindle 26 while it encounters small terrain contours. Smoother action overall with less side-to-side jerkiness and steering jerkiness results. Smoother suspension action also results with less binding and better tracking.

While the preferred embodiment of the invention has been illustrated and described, as noted above, many changes can be made without departing from the spirit and scope of the invention. For example, the biasing of the ski to allow tracking control can be anywhere between the chassis and the ski. Furthermore, the standard double A-arm 4-bar linkage suspension may be replaced with any other type of vehicle suspension. Accordingly, the scope of the invention is not limited by the disclosure of the preferred embodiment. Instead, the invention should be determined by reference to the claims that follow.

The invention claimed is:

1. An attachment coupling for a vehicle riding member arranged for engagement with a riding surface, the attachment coupling securing said riding member to a vehicle suspension having an outer end, the coupling comprising:
   a. a translational member secured to an outer end of the vehicle suspension, said translational member allowing said riding member to translate generally transversely relative to the outer end of the vehicle suspension during vehicle movement relative to the riding surface, said translational member having a outer end and an inner end; and
   b. a biasing member coupled to said riding member, said biasing member biasing said riding member to a preset position while allowing said riding member to move along said translational member toward and away from said outer end and said inner end while the vehicle moves over the riding surface.

2. The attachment coupling of claim 1, wherein said translational member comprises a slide bar arranged generally transverse to the direction of movement of the riding member, the riding member shifting position along said slide bar during suspension movement.

3. The attachment coupling of claim 2, wherein riding member is biased to the outer end of said translational member.

4. The attachment coupling of claim 3, wherein said biasing member comprising a spring disposed on the slide bar.

5. The attachment coupling of claim 1, further comprising a steering spindle coupled between the suspension and the riding member, said translational member being secured to a lower end of said spindle.

6. The attachment coupling of claim 5, wherein said translational member comprises a slide axle having an axis generally transverse to the direction of travel of the riding member.

7. The attachment coupling of claim 5, wherein said riding member includes a ski, the ski being attached to the lower end of the spindle, the translational member coupling the ski to the spindle.

8. A vehicle suspension secured between a vehicle and a riding member, the suspension comprising:
   a. a suspension arm extending from the vehicle;
   b. a spindle secured to the end of said suspension arm;
   c. a slide member secured to said spindle, said slide member having an inner end and an outer end, wherein said riding member is slidably mounted on said slide member allowing transverse movement of said riding member relative to said spindle during vehicle travel; and d. a biasing member coupled to said riding member, said biasing member biasing said riding member toward the outer end of said slide member.

9. The suspension of claim 8, wherein said slide member has a slide axis generally transverse to a direction of travel of the riding member.

10. The suspension of claim 9, wherein said slide member comprises a rod on which the riding member is secured, said biasing member comprising a spring held on said rod.

11. The suspension of claim 8, further comprising a second suspension arm secured between the vehicle and the spindle.

12. The suspension of claim 11, wherein said riding member comprises a snowmobile ski, the ski being attached to a lower end of the spindle, the slide member coupling the ski to the spindle.

13. The suspension of claim 12, wherein said biasing member comprises a spring held on the slide member in compression between the spindle and the ski.

14. A tracking control system for a snowmobile ski suspension, wherein the suspension includes a suspension arm secured to a chassis on one end and to a steering spindle on the other end, the spindle being secured to a ski, said tracking control system comprising:
a. a slide member secured to the ski and to the spindle, said slide member having an inner end, an outer end, and a transverse axis relative to the spindle, the spindle coupled to said slide member for transverse movement on said axis of the spindle relative to the ski while the snowmobile is driven over a surface; and
b. a biasing member coupled between the ski and the spindle, said biasing member biasing the ski to one end of the slide member.

15. The system of claim 14, wherein said slide member comprises a bar secured within a ski saddle of the ski, the bar oriented generally transverse to the longitudinal direction of the ski.

16. The system of claim 15, wherein said biasing member biases said ski to an outer end of said bar.

17. The system of claim 14, wherein the suspension includes a four-bar linkage arrangement with two arms extending from a snowmobile chassis, the spindle being held at the outer ends of the two arms and said slide member being secured to a lower end of the spindle below and generally outward of the arms.

18. The system of claim 17, wherein the ski includes a mounting saddle, said slide member being secured within the mounting saddle along an axis generally transverse to the longitudinal direction of the ski.

19. The system of claim 18, wherein said biasing member comprises a spring positioned within the ski saddle, between the spindle and one side of the saddle.

20. A tracking control system for a snowmobile having a chassis and at least one ski, the system comprising:
a. a suspension arm extending outwardly from the chassis, said arm being pivotally secured to the chassis;
b. a spindle secured to an outward end of said suspension arm, said spindle having an upper end and a lower end; and
c. a slide bar secured to the lower end of said spindle, said slide bar being oriented generally transverse to said spindle and generally transverse to a major axis of the ski, said ski being movably coupled to said slide bar allowing said ski to move transversely relative to said spindle along said slide bar while the snowmobile moves over a riding surface.

21. The tracking control system of claim 20, further comprising a spring coupled between said spindle and said ski, said spring biasing said ski in a direction away from said chassis.

* * * * *